March 10, 1970  N. S. FOX ET AL  3,499,320
METHOD AND APPARATUS FOR MEASURING THE LOAD DEFORMATION
CHARACTERISTICS OF SOIL BY PRESTRESSING AND
THEN DEFORMING Filed Sept. 1, 1967  3 Sheets-Sheet 1

INVENTORS
NATHANIEL S. FOX
RICHARD L. HANDY

BY Joseph G. Werner
John M. Winter
ATTORNEYS

March 10, 1970  N. S. FOX ET AL  3,499,320
METHOD AND APPARATUS FOR MEASURING THE LOAD DEFORMATION
CHARACTERISTICS OF SOIL BY PRESTRESSING AND
THEN DEFORMING
Filed Sept. 1, 1967  3 Sheets-Sheet 2
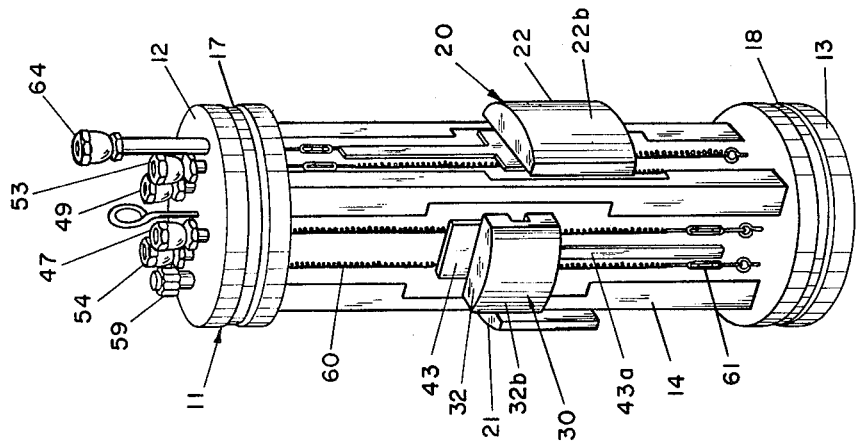
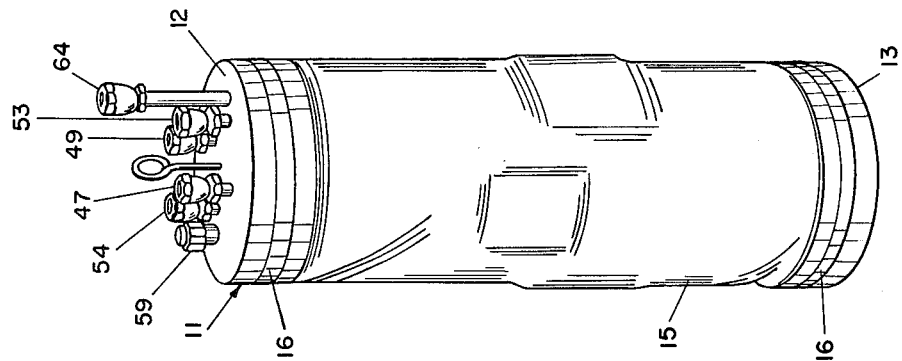
INVENTORS
NATHANIEL S. FOX
RICHARD L. HANDY
BY
*Joseph G. Werner*
*John M. Winter*
ATTORNEYS

United States Patent Office 3,499,320
Patented Mar. 10, 1970

3,499,320
METHOD AND APPARATUS FOR MEASURING THE LOAD DEFORMATION CHARACTERISTICS OF SOIL BY PRESTRESSING AND THEN DEFORMING
Nathaniel S. Fox, 6211 Raymond Road, Madison, Wis. 53711, and Richard L. Handy, Des Moines, Iowa (Iowa State University, Ames, Iowa 50010)
Filed Sept. 1, 1967, Ser. No. 665,062
Int. Cl. G01n 3/08
U.S. Cl. 73—94                 12 Claims

ABSTRACT OF THE DISCLOSURE

Method and apparatus for applying a simulated gravitational pressure for reducing the inherent distortion between a model footing-soil system and the actual foundation-soil system. The model load test apparatus has rigid model footing plates which are movable laterally outward within an expandable membrane whereby a "surcharge pressure" equal to the distance from the top of the test bore hole to the center of the model footing plates times the unit weight of the soil and a "simulated gravitational pressure" equal to the ratio of the smallest linear dimension of the full size foundation to the smallest linear dimension of the model footing plates times the unit weight of the soil times the depth of the soil affected are first applied to the wall of a test bore hole by inflating the expandable membrane and then the model footing plates are expanded to deform the soil under incremental loads.

BACKGROUND OF THE INVENTION

Field of the invention

Our invention relates generally to a method and model footing apparatus for making measurements in a test-bore hole of the load-settlement characteristics of soil for accurately predicting the amount of settlement of a full scale structure.

Description of the prior art

Settlement prediction is one of the major tasks of the soil engineer today. Most structures are ultimately supported by soil, and soil, being a deformable material, compresses upon application of a load. This compression causes a vertical downward displacement of the structure and its lowest extremity, the foundation or footing. This displacement is called settlement.

It is known that soil settlement is a funcion of the load; the time of loading; the size, shape and rigidity of the foundation or footing applying the load; and, of course, the soil characteristics. These soil characteristics include its compressibility, shear strength, density, moisture content, and permeability.

The phenomenon of soil settlement may be considered to involve three separate processes, namely:

(a) Elastic settlement caused by deformation of the soil mass by compression of void spaces immediately after application of a load;

(b) Consolidation settlement which is the settlement caused by the compression of soil voids simultaneous with expulsion of soil water from these voids; and (c) Shear settlement caused by soil particles sliding with respect to one another.

At present, soil settlement is most often predicated from measuring the amount of consolidation in laboratory tests on what are commonly referred to as "undisturbed soil samples." The soil is either sampled by hand trimming or by pushing a thin walled Shelby-Tube into the soil and lifting out a sample. The soil sample is then placed in a device known as a "consolidometer" where the sample is restricted from undergoing lateral displacement while a vertical load is applied to the sample, thus maintaining one dimensional consolidation within the sample. Vertical deformation measurements of the consolidation sample with corresponding time and load increments are recorded and interpreted. The settlement of a proposed full-scale structure resting on the soil is then predicted by extrapolation.

The shortcomings of such laboratory testing are well known. The samples, while called "undisturbed" are really not, and the amount of disturbance and the effect thereof are difficult to evaluate. Sample recovery is often difficult and the laboratory testing of the samples is quite time consuming. Consolidation is only one of at least three processes involved in soil settlement. Consolidation tests do not allow for evaluation of the effect of the size, shape and rigidity of the foundation on the settlement. The results of the laboratory testing of so called "undisturbed" samples in a consolidometer are often inaccurate and therefore this known system of settlement prediction lacks reliability.

A complete settlement analysis should include all three settlement mechanisms or components, and, furthermore, should consider the soil and the foundation together as a system, rather than the soil alone. The tests should preferably be made "in-place," that is, in a test bore hole such as the type typically made in site explorations.

There is presently one known type of soil deformation apparatus for "in-place" soil testing in use today. This apparatus, which is referred to as a "pressure meter" was patented in the United States under Patent No. 2,957,341 by L. F. A. Menard in 1960. The "pressure meter" apparatus is designed to be lowered into a test bore hole and then a gradually increasing pressure is applied on the soil by means of an incompressible fluid pumped into three stacked, expandable cell structures. Equal pressure is applied in each of the three cell structures, the purpose of the upper and lower cells being to prevent the middle cell from expanding upward or downward. The deformation of the soil in contact with the middle cell is measured by measuring the volume of incompressible fluid displaced in that cell. The deformation opposite the upper and lower cells is not measured.

The pressure-volume data thus obtained are used to plot load-deformation curves and the characteristics of the soil are then taken from these curves.

Any "in-place" testing apparatus, including Menard's, has readily apparent advantages over the older consolidation laboratry testing of "undisturbed" samples in that "in-place" testing eliminates the necessity and difficulty of obtaining samples. The soil is tested in its natural condition and in its natural location so that the chances of error due to sample handling are eliminated and reliability is greatly increased. Furthermore, results can be obtained quickly in the field and are available for use much more readily.

While Menard's "pressure meter" has the aforeside advantages over the laboratory consolidation testing methods, it nevertheless has several shortcomings of its own.

First, since all footings and foundations are normally emplaced at some depth below the ground surface, and not at the surface, it is known that a certain "surcharge load" exists on all sides of the foundation. The Menard apparatus takes no account of this "surcharge load" which is normally considered to be equal to the depth to the bottom of the foundation times and unit weight of the soil.

Secondly, with the Menard type apparatus, the load-settlement data are obtained from the expansion of an inflatable elastic cell constrained between two similar abutting cells. No model footing or foundation is introduced, therefore, no account is made of the size of the footing or foundation on the load-settlement characteristics of the system.

Tests where a model footing is constructed and tested in order to predict the behavior of full-scale prototype foundations or footings, often called model load tests, are not generally new, but they have been performed with only limited success from about 1930 to the present. To date, attempts to use small-scale model footings to verify quantitative relationships for full-scale footings performance have been unsuccessful due to difficulty in evaluating the effects of the difference in the sizes of the model and full-scale footings.

The principles underlying the construction of models and the interpretation of model test results to predict full-size prototype performances, comprises the theory of similitude. The similitude theory is developed from dimensional analysis based on the principle of dimensional homogeneity between the physical quantities appearing in an equation relating the quantities. From the similitude theory and analysis it is known that modeled soil-footing systems are not truly similar to the real soil-foundation system and therefore there is "distortion" between modeled and full-scale systems.

Only a few examples have been found in which similitude theory has been used in model load investigations and none of these investigations attempted to employ distorted model theory, nor did they attempt to reduce the amount of distortion involved between the modeled system and the full-scale system, although the presence of distortion was recognized.

SUMMARY OF THE INVENTION

We have invented a method and apparatus wherein a predetermined pressure derived from similitude analysis is applied to the soil in a test bore hole to simulate gravitational pressure within the soil to reduced inherent distortion between the model soil-footing system and the full-scale system. A "surcharge pressure" which is the pressure of the soil adjacent to the foundation above an imaginary plane parallel to the bottom foundation is also applied on the model soil-footing system together with the simulated gravitational pressure.

The exclusive and beneficial features of our method and apparatus are that by employing a model load test device having rigid footings which are movable laterally outward within an expandable membrane we can, by first expanding the membrane, supply a measured and controlled "surcharge pressure" and a "simulated gravitational pressure" to reduce the inherent distortion in the model system. Then, subsequently and separately, we can apply incremental loads on the soil in the test bore hole by expanding the model footings and then measure the deformation of the soil for the incremental increases in load for predicting the settlement of a full-scale foundation.

Two sets of different sized model footing plates are provided in thes device to permit experimental verification of the similitude theory and to enable the measurement of the magnitude of distortion remaining in the model footing-soil system for different soils.

Further objects, features and advantages will be apparent from the following detailed description taken in conjunction with the accompanying drawings showing a preferred embodiment exemplifying the principles of our invention.

BRIEF DESCRIPTION OF THE DRAWINGS

FIGURE 2 is a perspective view of the head portion of our device which is lowered into a test bore hole.

FIGURE 3 is a perspective view of the head portion of our device which is lowered into a test bore hole with the expandable membrane removed therefrom.

DESCRIPTION OF THE PREFERRED EMBODIMENT

Figure 1:
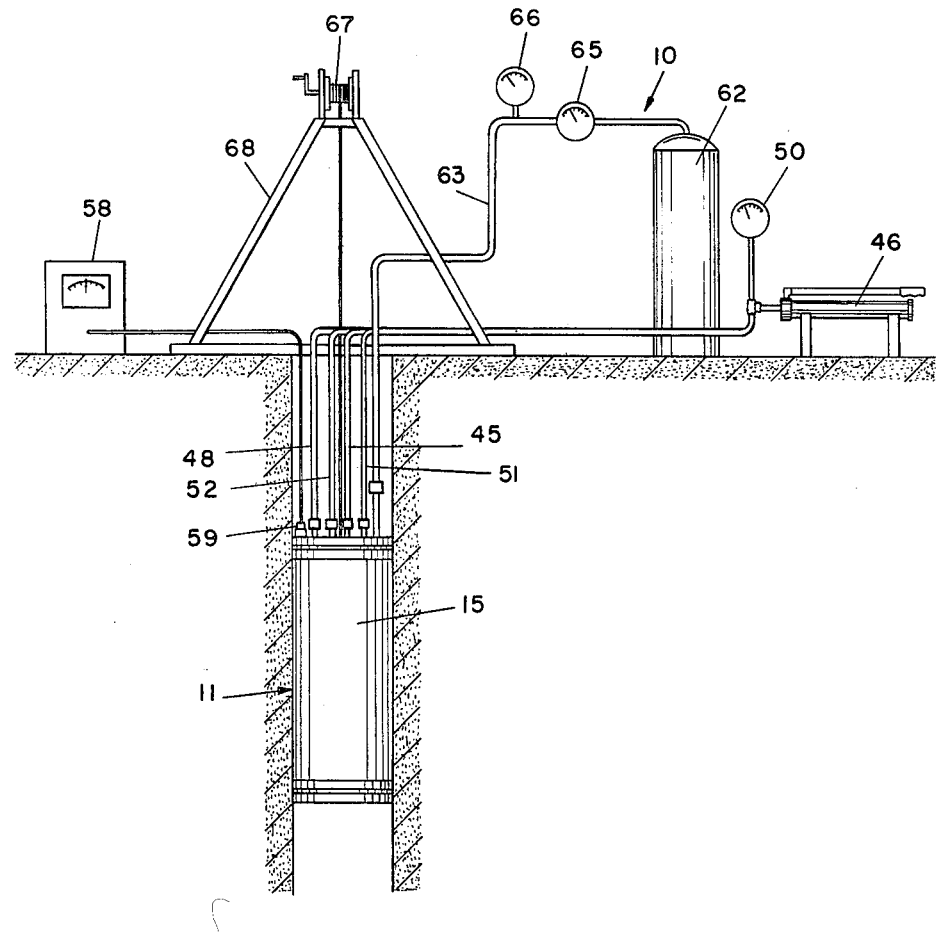
FIGURE 1 is a schematic view of our soil testing apparatus.

In one assumes that the model soil-footing system and the real system are similar, then employing commonly used soil engineering equations describing the three common mechanisms of soil settlement; elastic settlement, consolidation setetlement, and shear settlement, then settlement in the real system should be equal to $n$ times the settlement in the model system, where $n$ is the ratio of the smallest lineal dimensions of the foundation and model footing. The fact that this is not achieved indicates that true similarity does not exist in model and full-scale systems.

The inherent distortion involved in a modeled system as compared to the full-scale system is also apparent from the following two equations which we have derived from similitude theory analysis, (1) $$\frac{R_m}{b_m^2} = \frac{R}{b^2}$$

$$\frac{R_m}{b_m^3 \gamma_m} = \frac{R}{b^3 \gamma}$$

wherein $R$ is the applied load force of the foundation, $R_m$ is the applied load force in the model system, $b$ is the least linear dimension of the full size foundation, $b_m$ is the least linear dimension of the model footing, $\gamma$ is the unit weight of the actual soil, and $\gamma_m$ is the unit weight of the soil in the model system.

The equations would both have to be satisfied for true similarity of model and full-scale systems.

The same soil is to be used with both the model and the full-scale systems, and therefore $\gamma_m$ will equal $\gamma$. The test is performed with the loading restriction that the load pressure ($R$ per area) of the model be the same as Equation 1, since the geometries have been stipulated as being similar. In other words, the ratio of $R_m$/area in the model to $R$/area in the full-scale system is the same as the ratio of $R_m/b^2$ in the model to $R/b^2$ in the full size system. Therefore, the first equation is satisfied.

Substituting Equation 1 into Equation 2, it is apparent that Equation 2 cannot be satisfied unless $\gamma_m = b\gamma/b_m$. The unit weight of the soil in the model system must equal the unit weight of the actual soil multiplied by a ratio of smallest linear dimension of the foundation to the smallest linear dimension of the model footings. Thus, the effective weight of the soil in the model system must be increased over that of the actual soil by their linear size ratio $n$. Therefore, if the model is $\frac{1}{10}$ the linear size of the full-scale foundation, the effective weight of soil in the model system must be 10 times as much as that of the actual soil. Since $\gamma_m = \gamma$, because we are using the same soil, an artificial method must be employed to change the effective weight of the model soil, $\gamma_m$.

Thus, if the model and full-scale or prototype systems could be made similar, or more similar, by reducing the amount of distortion, the settlement in the full-scale system would more closely approximate $n$ times the settlement in the model system. If a close approximation could be achieved with model footing systems, reliable settlement predictions for full-scale foundations would be possible.

We have discovered that the distortion involved in the model system with respect to the full-scale system may be substantially reduced and, thus, a truer model system established by increasing the effective weight or the gravitational acceleration of the soil in the model system by applying a predetermined pressure to the soil in the test bore hole before applying the soil deforming footing loads.

We have further discovered that the distortion involved in the model system with respect to the full-scale system can be substantially reduced or virtually eliminated by increasing the effective weight or the gravitational acceleration of the soil in the model system by applying a "simulated gravitational pressure" (sgp) to the soil defining the wall of the test bore equal to the ratio of the smallest linear dimension of the full-scale foundation to the smallest linear dimension of the model footing times the unit weight of the soil times the depth of the soil affected.

At least four methods exist to determine the depth of soil affected by the sgp. We are using the term "depth" here to mean the horizontal distance into the soil. First, one can assume a constant depth for both sized model plates. This method contains the inherent assumption that the model plate settlement is largely a surface-controlled phenomena.

A second approach is to assume that the depth of soil affected is a function of the dimension of the model plate. For example, the actual depth could be taken as about 1.5 times the least width of the model foundation.

A third approach is purely experimental, involving trial-and-error tempered with experience and judgement. A depth is assumed and the sgp is calculated based on the assumed depth and tests are then conducted in the soil. The depth of soil affected may then be altered until the test results are sufficiently close to the theoretical values. The depth corresponding to the best test results is then used for subsequent testing in that soil.

The fourth approach is completely theoretical, wherein one may employ theories of soil mechanics and mathematical techniques to determine the volume of soil affected by the foundation load. Once the volume is determined, and the shape of the soil comprising this volume is determined, an "average" depth may be computed. This average depth could then be used for the depth of soil affected.

Although one of the above methods, or a combination of more than one, may well prove the most practical and/or most accurate in determining the depth of soil affected, the importance of determining the exact, or very close approximation to the exact, depth of soil affected is decreased by the application of distorted model theory to the test results.

A pressure, equal to this "simulated gravitational pressure" plus a "surcharge pressure" which is equal to the distance from top of the test bore hole to center of the model footing times the unit weight of the soil, is maintained on the wall of the test bore hole while the soil deforming footing loads are applied.

Referring now more specifically to the drawings wherein like numerals refer to like parts throughout the several views, our model load testing device 10 is shown schematically in FIGURE 1.

Figure 4:
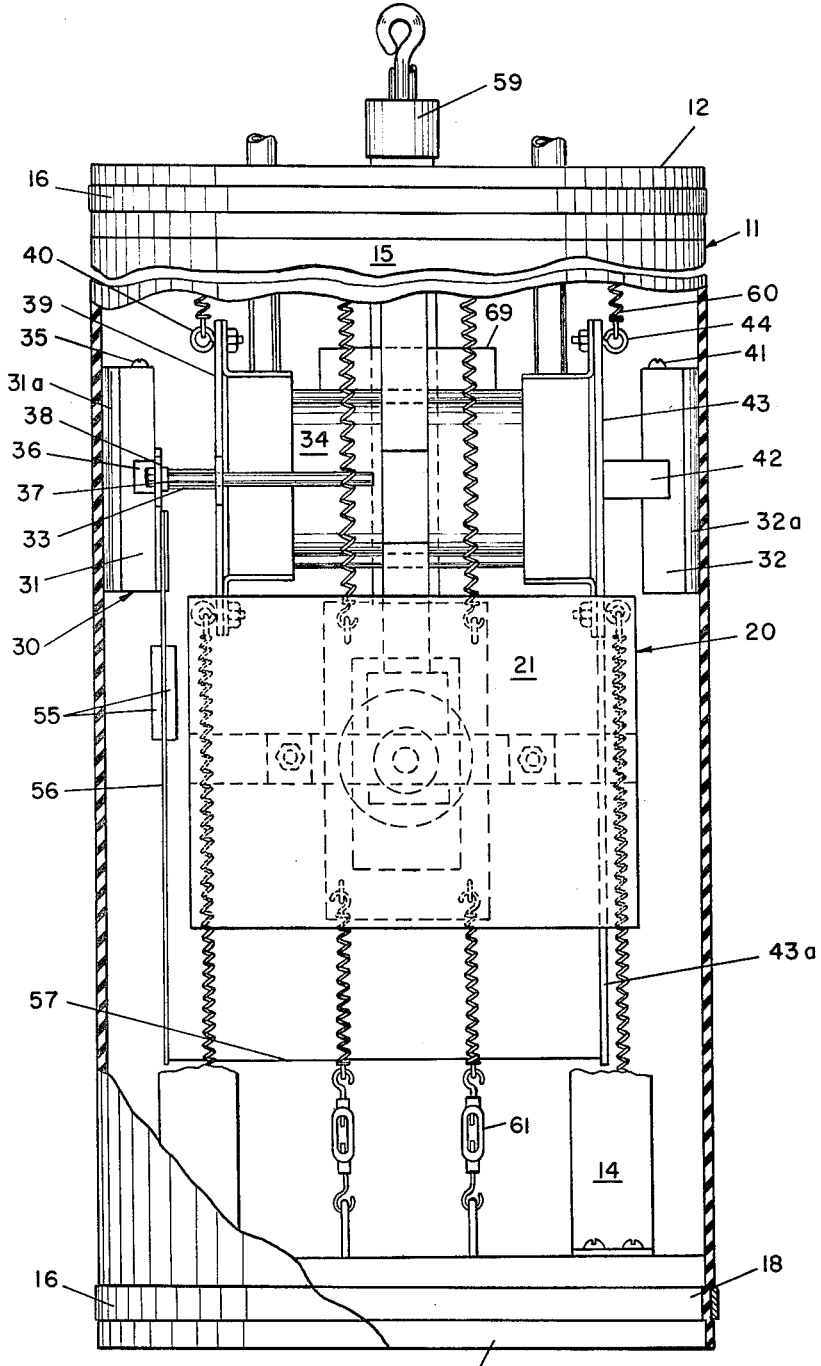
FIGURE 4 is an enlarged side view of the head portion of our device which is lowered into a test bore hole, with portions broken away.

As best shown in FIGURES 3–4, the device has a head portion 11 comprising a generally cylindrical frame having top and bottom discs, 12 and 13, connected by rigid angle-iron corner struts 14. An expandable cylindrical membrane 15 is mounted in air-tight relation on the two end discs 12 and 13 by attaching bands 16 which are received in grooves 17 and 18 in the end discs. The expandable membrane is preferably made of rubber.

Two pairs of model footing plates 20 and 30 are mounted within the rubber membrane 15 so that their directions of settlement are perpendicular to each other in substantially a horizontal plane. The two plates of the first and larger pair 20 are designated 21 and 22, and the two plates of the second and smaller pair 30 are designated 31 and 32. All of the model footing plates are curved with the same curvature as that planned for the test-bore hole, for example, with a 3.25 inch radius. This allows the pressure bearing surfaces of the plates to fully engage the wall of the test bore hole.

The larger plates 21 and 22 measure 3 inches in height by 4 inches in length, measured along the curved pressure bearing surfaces 21a and 22a. The smaller plates 31 and 32 measure 2 inches in height by 2.67 inches in length, measured along the curved pressure bearing surfaces 31a and 32a thereof. Thus, if the smaller plates are considered as the models, and the larger plates as the prototypes, then their linear scale ratio $n$ would be 1.5. These dimensions are exemplary only, and it is understood that other suitable sized plates may be used.

The two pairs of plates 20 and 30 are substantially geometrically similar, but not exactly, since the plates in each set have the same radius of curvature so that they can fully engage the surface of the test bore hole. It may be assumed that they are geometrically similar and any distortion which may be induced by the fact that they are not exactly so will merely contribute to the overall distortion present in the system.

Different size sets are used so that by considering one set the prototype and the other set the model we provide for experimental verification of the similitude theory and determination of the magnitude of distortion remaining in the model footing-soil system for different soils.

Both pairs of model footing plate arrangements are the same, except for the plate size difference as mentioned above. Accordingly we will describe only the smaller plate arrangement.

Model footing plate 31 is mounted on a piston 33 which is mounted for reciprocation in a double acting hydraulic cylinder 34. The plate 31 is secured on the end of the reciprocal piston 33 by a friction screw 35 which engages a block 36 threaded onto the end of the piston 33. A pair of guide rods 37 are mounted on a flange 38 secured to the block 36. The guide rods extend inwardly through holes in a mounting plate 39 secured to the hydraulic cylinder by eye-bolt 40. These guide rods prevent the model footing plate 31 from rotating with respect to the hydraulic cylinder 34.

The other footing plate 32 of the smaller pair 30 is mounted in fixed relation on the hydraulic cylinder 34 by a friction screw 41 engaging a block 42 secured to a mounting plate 43 attached to the opposite end of the hydraulic cylinder 34 by eye-bolts 44.

The reciprocal plate 31 of the first pair may be moved laterally outward within the expandable membrane 15 by means of hydraulic pressure supplied through hose 45 by a hydraulic pump 46 located at the ground surface as shown in FIGURE 1. Hose 45 is attached to the head of the device by a pipe coupling 47 on pipe 48 communicating with the interior of membrane 15 through end disc 12. Incremental loads may be applied to the pair of plates 30 by the hydraulic pump 46 for compressing the soil.

The footing plate 31 may be retracted by exhausting hydraulic fluid through hose 45 and supplying fluid to the opposite end of the cylinder 34 through a second hose 48 attached to coupling 49. The magnitude of the incremental load pressures is calculated from the hydraulic fluid pressure read on a pressure gauge 50 at the ground surface.

The first set of plates 20 is adapted to be similarly expanded and retracted by hydraulic pressure in hoses 51 and 52 connected to couplings 53 and 54, respectively, as shown schematically in FIGURE 1.

The amount of relative movement of the model footing platees 31 and 32 is measured by means of strain gauges 55 mounted on opposite sides of a flexible cantilever member 56 mounted for movement with the footing plate 31. A non-extensible member 57, such as a woven brass wire, connects the free end of the flexible cantilever member 56 with a rigid extension 43a of mounting plate 43 which is secured so as to remain fixed with respect to the diametrically opposite footing plate 32. As the model footing plate 31 moves laterally outward within the expandable membrane, the cantilever member 56 and the rigid extension 43a separate, whereby the non-extensible connecting wire 57 bends the cantilever member so that with proper calibration the strain gauges 55 measure the amount of total relative movement of plates 21 and 22. This measurement may be read on a strain indicator 58 at ground level which is conducted to strain gauges 55 by connector 59 mounted in the top disc 12 of the head 11.

Only one piston 33 exists within the cylinder 34 so that a true action-reaction situation is obtained. Since the strain gauge arrangement measures movement of both diametrically opposed footing plates 31 and 32 into the soil defining the wall of the test bore hole, the measured values are divided by two.

The pair of plates 30 is allowed to "float" within the head 11 so that equal loads and settlements can be obtained at each of plates 31 and 32. This is accomplished by suspending the cylinder 34 from eight extension springs 60 attached to eye-bolts 40 and 44 and to the end discs 12 and 13. Turn-buckles 61 are provided for adjusting the tension in the springs and the vertical position of the cylinder 34 in the head 11.

As discussed hereinbefore, prior to expansion of the model footing plates, a predetermined pressure comprising the "surcharge pressure" and the "simulated gravitational pressure" is applied to the wall of the test bore hole by supplying air-pressure within the rubber membrane 15. This air pressure is provided from a compressed air tank such as 62 located at the ground surface. Pressure is supplied inside of the membrane 15 by an air hose 63 attached to coupling 64 for admission through the top disc 12 of the head. An air pressure regulator 65 and a gauge 66 are provided as shown in FIGURE 1.

In operation, a test bore hole is first drilled and boring logs are made showing depth to changes in soil type and other desired information. The hole should then be reamed to produce a smooth cylindrical hole of the proper size for the model load testing device.

The head 11 of the model load testing device is then lowered into the test bore hole to the desired test depth by a reel of cable 67 mounted on a tripod 68 placed over the test bore hole at the ground surface.

An "opening air pressure" is then applied in the membrane until it just engages the wall of the test bore hole. This "opening pressure" for the particular membrane should be precalculated in the laboratory by placing a circular ring with an inside diameter of 6.5 inches (the diameter of the test bore hole) over the rubber membrane for calibration. The pressure is slowly increased within the membrane until the amount of pressure that causes the membrane to touch the ring is determined. This pressure is then regarded as the "opening pressure."

The "surcharge pressure" and the "simulated gravitational pressure" are calculated for the particular test depth and soil, and this predetermined air pressure is additionally applied in the rubber membrane 15 causing it to exert pressure radially on the wall of the test bore hole to remove the aforementioned inherent distortion which exists between the model footing-soil system and the full-scale foundation-soil system. The "opening pressure" when added to the "surcharge pressure" and the "simulated gravitational pressure" gives the air gauge pressure. This gauge pressure should be maintained during subsequent expansion of the model footing plates within the membrane.

The next step is the application of the hydraulic pressure to force the larger footing plates 21 and 22 into the soil defining the wall of the test bore hole. The amount of relative movement between the diametrically opposed footing plates 21 and 22 is read on the strain indicator 58 after the load application. When the rate of movement of the plates slows down to less than a predetermined amount, for example, less than 0.002 inch per minute, the next incremental load application is applied to the plates by the hydraulic pump to further deform the soil defining the wall of the test bore hole. This repeated incremental load application is continued for as many loads as desired.

The test sequence is first performed with the large pair of model footing plates 20. After this test has been completed, the plates are retracted and the air pressure in the expandable membrane is increased in accordance with the surcharge and simulated gravitational pressure theories for the smaller pair of plates 30. The small plate set is then tested by again applying incremental increases in load pressure to the wall of the test bore hole.

When the small plate set test has been completed the plates 31 and 32 are retracted and the air pressure in the rubber membrane is released. The model footing test device is then ready to test at another depth within the test bore hole or in another hole. The head 11 of the device does not have to be raised out of the test bore hole between tests for cleaning or other purposes.

The apparatus should be calibrated in a laboratory prior to use in the field. The "opening pressure" for the membrane is determined as discussed hereinbefore.

The peneration force is determined by placing the apparatus so that one model footing plate rests on a fixed base and the diametrically opposite plate of the pair engages the bottom of a calibrated proving ring. The force measured by the proving ring is divided by area of one plate to obtain the load pressure.

The strain gauges are calibrated by means of Ames dials preferably reading to within $\frac{1}{10,000}$ inch. Each of the dials is mounted to read the total relative movement of the diametrically opposed plates, similar to the operation of the strain gauges.

As shown in FIGURE 4, a small vibration unit 69 may be mounted on the hydraulic cylinder 34. The purpose of the vibrator is to simulate the vibration caused by equipment existing in certain structures, such as, for example buildings equipped with large generators. The vibrations produced by such structures often causes additional foundation settlement, particularly if the foundation rests on sand or other granular soil. The small vibration unit should be adjustable so that frequencies and amplitudes can be modeled with those of the actual foundation by employing theories of similitude. This vibrator would be used where vibration is expected to produce additional settlement, where the extent of this additional settlement is required to be predicted.

It is understood that the present invention is not confined to the particular steps, construction or arrangement of parts herein illustrated and described, but embraces all such modified forms thereof as may come within the scope of the following claims.

We claim:

1. Apparatus for measuring the load-deformation characteristics of the soil in a test bore hole, comprising:
   (a) first means for applying a predetermined pressure against the wall of said test bore hole,
   (b) second means for applying incremental increases in load pressure to deform only a portion of that area of the wall of said test bore hole against which said predetermined pressure has first been applied by said first means, and
   (c) third means for measuring the amount said second means deforms the wall of said test bore hole in response to said incremental increases in load pressure.

2. The apparatus as specified in claim 1 wherein said second means comprises:
   (1) at least two pairs of diametrically opposed model footing plates, each of said pairs being of a different size, at least one of said footing plates in each of said pairs being mounted for reciprocal lateral movement, and
   (2) means for producing said incremental load pressures.

3. Apparatus for measuring the load-deformation characteristics of the soil in a test bore hole, comprising:
  (a) a generally cylindrical expandable membrane,
  (b) means for inflating said membrane for applying a predetermined pressure against the wall of said test bore hole,
  (c) at least one pair of diametrically opposed model footing plates mounted within said membrane,
  (d) means for moving at least one of said footing plates laterally outward within said membrane with incremental increases in load pressure to deform only a portion of that area of the wall of said test bore hole against which said predetermined pressure has first been applied through said membrane, and
  (e) means for measuring the amount said footing plates deform the wall of said test bore hole in response to said incremental increases in load pressure.

4. The apparatus as specified in claim 3 wherein said third means comprises:
  (1) a flexible cantilever member mounted for movement with said movable footing plate,
  (2) a rigid member mounted so as to remain fixed with respect to the other footing plate of said pair,
  (3) a non-extensible member connecting said cantilever member to said rigid member for flexing said cantilever member as said movable footing plate is moved laterally outward to deform the wall of said test bore hole, and
  (4) a strain indicator attached to said flexible cantilever member to measure the deflection thereof for determining the amount said footing plates deform the wall of said test bore hole in response to the incremental load pressures applied through said footing plates.

5. The apparatus as specified in claim 3 having a second pair of diametrically opposed model footing plates mounted within said exanpdable membrane at substantially 90° from said first pair of footing plates, the footing plates of said second pair being substantially geometrically similar to said first pair of model footing plates and being smaller in size.

6. The apparatus as specified in claim 5 wherein all of said model footing plates have a pressure bearing surface having substantially the same radius of curvature as the test bore hole.

7. Apparatus for measuring the load-deformation characteristics of the soil in a test bore hole, comprising:
  (a) first means for applying a predetermined pressure against the wall of said test bore hole,
  (b) at least one pair of diametrically opposed model footing plates, at least one of said footing plates being mounted for reciprocal lateral movement,
  (c) means for producing incremental increases in load pressure to deform only a portion of that area of the wall of said test bore hole against which said predetermined pressure has first been applied by said first means,
  (d) means for measuring the amount said footing plates deform the wall of said test bore hole in response to said incremental increase in load pressure, and
  (e) means for vibrating said diametrically opposed footing plates.

8. Apparatus for measuring the load-deformation characteristics of soil in a test bore hole, comprising:
  (a) a frame having top and bottom discs spaced apart by rigid connecting struts,
  (b) a generally cylindrical expandable membrane encircling said frame,
  (c) means for inflating said expandable membrane to apply a predetermined pressure against the wall of said test bore hole,
  (d) footing means suspended within said expandable membrane by tension springs attached to said top and bottom discs, said footing means having;
    (1) at least one pair of model footing plates, and
    (2) a hydraulic cylinder for moving at least one of said footing plates laterally outward within said extendable membrane for applying load pressure to only a portion of that area of the wall of said test bore hole against which said predetermined pressure has first been applied,
  (e) means for producing incremental increases in load pressure for moving said footing means laterally outward within said expandable membrane to deform the wall of said test bore hole,
  (f) a flexible cantilever member mounted for movement with said laterally movable footing plate,
  (g) a rigid member mounted so as to remain fixed with respect to the other footing plate of said pair,
  (h) a non-extensible member connecting said rigid member to said cantilever member for flexing said cantilever member as said movable footing plate is moved laterally outward to deform the wall of said test bore hole, and
  (i) a strain gauge attached to said cantilever member to measure the deflection thereof for determining the amount said footing plates have deformed the wall of said test bore hole in response to the incremental increases in load pressure applied through said footing plates.

9. In a method of predicting the settlement of a foundation in soil, the steps of:
  (a) lowering a model footing device into a test bore hole in the soil,
  (b) applying a predetermined lateral pressure against an area of the wall of said test bore hole,
  (c) deforming only a portion of that area of the wall of said test bore hole against which said predetermined pressure has first been applied by applying incremental increases in load pressure thereto by moving model footing plates laterally outward thereagainst, and
  (d) determining the deformation of said soil in relation to said incremental increases in pressure.

10. In a method of predicting the settlement of a foundation in soil, the steps of:
  (a) lowering into a test bore hole in the soil a model footing device having an expandable membrane encircling a first pair of diametrically opposed footing plates at least one of which is laterally extendable and a second pair of smaller diametrically opposed footing plates at least one of which is laterally extendable at substantially right angles to the first pair of footing plates,
  (b) applying a first predetermined pressure to an area of the soil defining said test bore hole by inflating the expandable membrane thereagainst,
  (c) deforming a first portion of that area of the soil defining said test bore hole against which said first predetermined pressure has been applied by applying incremental increases in pressure thereto by moving said first extendable footing plate laterally outward within said expandable membrane,
  (d) determining the deformation of the soil for the incremental increases in pressure imparted by said first pair of footing plates,
  (e) retracting said first extendable footing plate,
  (f) applying an increased predetermined pressure to the area of soil defining said test bore hole by further inflating said expandable membrane,
  (g) deforming a second portion of that area of soil defining said test bore hole against which said increased predetermined pressure has been applied by applying incremental increases in pressure thereto by moving said second extendable footing plate laterally outward within said expandable membrane, and
  (h) determining the deformation of the soil for the incremental increases in pressure imparted by said second pair of footing plates.

11. The method of predicting the settlement of a foundation in soil as specified in claim 10 wherein:
  (a) said first predetermined pressure comprises the sum of;
    (1) a surcharge pressure substantially equal to the distance from the top of the test bore hole to the center of said first pair of diametrically opposed footing plates times the unit weight of the soil being tested, plus
    (2) a simulated gravitational pressure equal to the smallest linear dimension of said foundation divided by the smallest linear dimension of said first footing plates times the unit weight of the soil being tested times the depth of the soil affected by the model footing;
  (b) said increased predetermined pressure comprises the sum of;
    (1) a second surcharge pressure equal to the distance from the top of said test bore hole to the center of said second footing plates times the unit weight of the soil being tested, plus
    (2) a second simulated gravitational pressure equal to the smallest linear dimension of said foundation divided by the smallest linear dimension of said second footing plates times the unit weight of the soil being tested times the depth of the soil affected by said second model footing plates.

12. In a method of predicting the settlement of a foundation in soil, the steps of:
  (a) lowering a model footing device into a test bore hole in the soil,
  (b) applying a predetermined lateral pressure against an area of the wall of said test bore hole,
  (c) deforming only a portion of that area of the wall of said test bore hole against which said predetermined pressure has first been applied by applying incremental increases in load pressure thereto by moving model footing plates laterally outward thereagainst,
  (d) vibrating said model footing plates while applying said incremental load pressures thereto, and
  (e) determining the deformation of said soil in relation to said incremental increases in load pressure.

References Cited

UNITED STATES PATENTS 3,349,610 10/1967 Noël _____ 73—84
3,364,737 1/1968 Comes _____ 73—151

OTHER REFERENCES

"Accuracy of Goldbeck Cell in Laboratory Tests" by W. H. Seaquist Engineering News-Record, June 7, 1934 pp. 730–732.

JAMES J. GILL, Primary Examiner

E. J. KOCH, Assistant Examiner

U.S. Cl. X.R.

73—84, 151